United States Patent [19]

Knight et al.

[11] 3,844,350

[45] Oct. 29, 1974

[54] OIL RECOVERY USING POLYMER PRESLUG

[75] Inventors: Bruce L. Knight; John S. Rhudy, both of Littleton, Colo.

[73] Assignee: Marathon Oil Company, Findlay, Ohio

[22] Filed: Apr. 26, 1973

[21] Appl. No.: 354,603

[52] U.S. Cl.................. 166/273, 166/274, 166/246
[51] Int. Cl............................................ E21b 43/22
[58] Field of Search.................... 166/273, 274, 246

[56] References Cited
UNITED STATES PATENTS

| | | | |
|---|---|---|---|
| 3,343,597 | 9/1967 | Gogarty et al. | 166/273 |
| 3,482,631 | 12/1969 | Jones | 166/273 |
| 3,581,824 | 6/1971 | Hurd | 166/273 |
| 3,605,894 | 9/1971 | Jones | 166/273 |
| 3,670,819 | 6/1972 | Dauben et al. | 166/273 X |
| 3,704,990 | 12/1972 | Sarem | 166/273 |
| 3,741,307 | 6/1973 | Sandiford et al. | 166/273 |

*Primary Examiner*—Stephen J. Novosad
*Attorney, Agent, or Firm*—Joseph C. Herring; Richard C. Willson, Jr.; Jack L. Hummel

[57] ABSTRACT

Oil recovery from reservoirs having connate water containing at least 500 ppm of divalent cation is improved by first injecting an aqueous preslug containing 50 – 2,000 ppm of a biopolymer and thereafter injecting a displacement slug, preferably a micellar dispersion, followed by a mobility buffer fluid and this, in turn, followed by a water drive. The preslug containing the biopolymer "insulates" the micellar dispersion from the connate water, the divalent cation tends to degrade the micellar dispersion.

9 Claims, No Drawings

OIL RECOVERY USING POLYMER PRESLUG

BACKGROUND OF THE INVENTION

1. Field of the Invention

This invention relates to displacing crude oil from a subterranean reservoir by injecting fluid through an injection means and displacing it toward a production means in fluid communication with the reservoir.

2. Description of the Prior Art

The Prior art uses micellar dispersions to displace crude oils from subterranean reservoirs. The micellar dispersions contain water, surfactant, hydrocarbon and optionally cosurfactant and/or electrolyte. Generally, these dispersions are not compatible with very high concentrations of divalent cations. Therefore, it is necessary that the micellar dispersion be designed to maintain its integrity or to "accept" the divalent cations without degrading the micellar dispersion and thus adversely influencing oil recoveries.

U.S. Pat. No. 3,343,597 teaches the injection of aqueous preslug of controlled ionic content previous to the injection of a microemulsion. The ionic content of the preslug preferably has the same ionic content as the water within the microemulsion and tends to insulate the micellar system from the ions in the formation water.

U.S. Pat. No. 3,482,631 teaches injection of an aqueous preslug containing a viscosity-imparting agent, electrolyte and/or semi-polar organic compound before the injection of a micellar dispersion. The viscosity increasing agent tends to (1) saturate adsorption sites on sand strata to insure that viscosity imparting agents in subsequent slugs are not "leached" from the subsequent slugs and (2) imparts a high viscosity to the preslug to insure a more stable displacement of the connate water. Examples of viscosity-imparting agent include partially hydrolyzed, high molecular weight polyacrylamides, polysaccharides, carboxymethyl cellulose, and similar materials.

U.S. Pat. No. 3,704,990 teaches injection of an aqueous polymer slug previous to the injection of a "miscible" solvent. The "miscible" solvent can be an oil-external microemulsion. The aqueous polymer preslug contains water having less than 50 ppm of salts and the polymer can be partially hydrolyzed polyacrylamides, acrylic acids/acrylamide copolymer, acrylic acid/acrylamidediacetone, acrylamide terpolymers, hydroxyethyl cellulose, carboxymethyl cellulose, polyacrylamides, polyoxyethylenes, and polysaccharides. It is not suggested that reservoirs containing high concentrations of divalent cations can be flooded.

The prior art has yet to find a solution to economically flooding reservoirs containing very high concentrations of divalent cations.

SUMMARY OF THE INVENTION

Applicants' invention is an effective means of economically flooding subterranean reservoirs having connate water containing high concentrations of divalent cations, e.g. 500 up to about 25,000 or more ppm of divalent cation. This is accomplished by injecting into the reservoir and displacing toward a production well 1–50 percent PV (pore volume) of an aqueous biopolymer solution followed by a micellar dispersion. The preslug inhibits degradation of the micellar dispersion by the divalent cations and also tends to uniformly displace the divalent cations ahead of the micellar dispersion. The preslug contains a polymer which is relatively insensitive to the effects of the high divalent cation concentration; preferably the polymer is a biopolymer at concentrations of 50–2,000 ppm.

PREFERRED EMBODIMENTS OF THE INVENTION

The miscible or miscible-like displacing agents that are adversely affected by high concentrations of divalent cations contain surfactant, water, and preferably hydrocarbon, and optionally cosurfactant, and/or electrolyte, and other components if desired. Specific examples include oil-external and water-external micellar dispersions (this term includes micellar solutions, microemulsions, "transparent" emulsions, hydrous soluble oils, etc.), oil-external and water-external emulsions, soluble oils, etc. Examples of these agents include those defined in U.S. Pat. Nos. 3,254,714 and 3,275,075 to Gogarty et al.; 3,506,070 and 3,506,071 to Jones; 3,497,006 to Jones et al.; 3,330,344 and 3,348,611 to Reisberg; 3,373,809 to Cooke, Jr.; 3,149,669 to Binder et al.; 3,163,214 to Csaszar; 3,208,515 to Meadors; 3,208,517 to Binder, Jr. et al. (water-external emulsion); 3,354,953 to Morse (miscible displacement, alcohols, LPGs and slugs miscible with the oil and miscible with the water); 3,512,586 to Holm; 3,348,611 to Reisberg; 3,697,424 to Holm; 3,714,062 to Askew et al.; 3,500,919 to Holm. Compositions of useful displacing agents as well as preferred components are taught within the above patents. The preferred displacing agent is a micellar dispersion.

The reservoirs for which this invention is applicable are those wherein the connate water contains about 500 to about 25,000 or more ppm of divalent cations, e.g. calcium and/or magnesium cations. Examples of such reservoirs are those more commonly known as containing 1,000 to about 10,000 and generally about 2,000 to about 5,000 ppm of the divalent cation.

The aqueous preslug which is injected previous to the injection of the displacing slug contains a polymer which is essentially insensitive to adverse effects of the high concentration of the divalent cations within the connate water. Examples of such polymers include biopolymers of the type manufactured by Xanco, a division of Kelco Co., San Diego, California, and identified under the trademark "Kelzan"-M. Kelzan-MF is a heteropolysaccharide produced by the action on a carbohydrate of the bacterial specie Xanthomonas campestris. Other species of the genus Xanthomonas which are useful in biopolymer production include Xanthomonas phaseoli, Xanthomonas malvacearum, Xanthomonas carotae, Xanthomonas translucens, Xanthomonas hederae, and Xanthomonas papavericola. These biopolymers generally exhibit molecular weights in the range of 200,000 to 3,000,000. The polymer is present in concentrations of about 50 to about 2,000 ppm, preferably about 100 to about 1,500, and more preferably about 200 to about 1,000 ppm. Formation pore volumes of about 1 to about 50 percent, preferably about 2 to about 25 percent, and more preferably about 5 to about 20 percent of the aqueous preslug are useful. The aqueous preslug may contain other additives to impart desired properties to the reservoir or to subsequent slugs which follow the aqueous preslug, e.g. it can contain surfactants, cosurfactants, and/or electrolytes, sacrificial agents to occupy adsorption sites on the reservoir rock, etc.

About 1 to about 75 percent or more and preferably about 1 to about 20 percent of the displacement slug is useful with this invention. The displacement slug can optionally be followed by a mobility buffer slug, e.g. 5 to about 100 percent and more preferably about 10 to about 75 percent formation pore volume. A water drive is generally used to displace these previously injected slugs toward the production well to recover crude oil therethrough. The mobility buffer slug is preferably an aqueous solution containing a mobility reducing agent; the agent can reduce the permeability of the reservoir rock and/or increase the viscosity of the aqueous solution. Examples of mobility buffer fluids are taught within the above-enumerated patents.

An important advantage of this invention is that the displacing slug can be designed at a lower cost since it is not necessary to predesign the displacing slug to overcome the adversities which the divalent cations in the connate water may impart to the displacing slug. For example, a micellar solution slug can be designed at a lower cost when it is known that the connate water will not adversely influence the phase stability of the micellar solution or the viscosity thereof.

The concentration of the polymer in the preslug must not be sufficiently high to cause mobility reduction, i.e. an unfavorable mobility ratio should not exist between the aqueous preslug and the injected displacing slug.

EXAMPLES

The following examples are presented to teach specific working embodiments of the invention. Unless otherwise specified, all percents are based on weights.

Berea sandstone cores 4 ft. long and 3 in. in diameter are first flooded with water containing 15,000 ppm of $CaCl_2$; they are then flooded with crude oil (viscosity =7 cp at 23°C) to irreducible water saturation and are thereafter flooded with water containing 15,000 ppm of $CaCl_2$ (5,410 ppm of $Ca^{++}$ cation) to residual oil saturation. The cores are then flooded with the following systems:

System 1

A 2 percent PV of an oil-external micellar solution is injected into the core. The micellar solution, has the following composition:

| Components | Weight Percent | |
|---|---|---|
| Hydrocarbon: crude oil having a viscosity of 7 cp at 23°C. | 38 | |
| Petroleum sulfonate, equiv. wgt. equals 420, activity = 60% | 7.6 | (active basis) |
| Water containing 400 ppm TDS (total dissolved solids) | 52 | |
| Cosurfactant (primary amyl alcohol | 2.4 | |

The micellar solution is followed by water containing 700 ppm of Dow 700 Pusher polymer, a partially hydrolyzed high molecular weight polyacrylamide (Pusher is a trademark of Dow Chemical Co., Midland, Michigan) and 500 ppm TDS (total dissolved solids) until oil production ceases.

System 2

Identical to System 1 except a 20 percent PV of aqueous preslug is injected before the micellar solution. The preslug contains 500 ppm of Kelzan-M (a biopolymer) dissolved in water containing 500 ppm TDS.

System 3

Identical to System 2 except the 20 percent PV volume of aqueous slug is injected previous to the micellar solution. The aqueous preslug does not contain any polymer.

Recoveries of the above three different systems are reported in Table I.

TABLE 1

| System | Preslug | Oil Recovery,% | Total Polymer Injected, PV × ppm |
|---|---|---|---|
| 1 | none | 30 | 840 |
| 2 | 20% PV containing biopolymer | 39 | 737 |
| 3 | 20% PV without biopolymer | 31 | 836 |

As is evident from the above table, the preslug of biopolymer increased relative oil recovery by 30 percent. Compared to System 3, a 26 percent increase in oil recovery is realized. System 2 compared to System 3 demonstrates that improved oil recovery is due to polymer within the preslug and not merely the aqueous preslug. Due to favorable mobility ratio, the polymer preslug in System 2 is more effective than the aqueous preslug in System 3 in displacing connate brine; italso reduces divalent cation interaction with the micellar solution. You will also note that the total polymer required is less using System 2—in System 2 this includes biopolymer preslug as well as the Pusher polymer used in mobility buffer slug. As an additional benefit, the polymer requirement was reduced by System 2 by at least 12 percent compared to Systems 1 and 3.

It is not intended that the invention be limited by the above specific examples. Rather, it is the intent of the inventors that all equivalents be incorporated within the scope of the invention as defined within the specification and appended claims.

What is claimed is:

1. In a process of recovering hydrocarbon from a subterranean reservoir containing water having at least 500 ppm of divalent cation and wherein the reservoir has an injection means in fluid communication with a production means and a miscible or miscible-like displacement slug which is adversely influenced by the divalent cations is injected and displaced toward the production means to recover hydrocarbon therethrough, the step comprising injecting previous to the injection of the displacement slug about 1 to about 50 percent formation pore volume of an aqueous solution containing about 50 to about 2,000 ppm of a biopolymer, the effect of the aqueous biopolymer solution being to inhibit the tendency of the divalent cations to adversely influence hydrocarbon recovery with the displacement agent.

2. The process of claim 1 wherein a mobility buffer slug is injected behind the displacement slug.

3. The process of claim 1 wherein the displacement slug is a micellar dispersion comprised of hydrocarbon, petroleum sulfonate, water, and optionally cosurfactant and/or electrolyte.

4. The process of claim 3 wherein the water within the reservoir contains at least 1,000 ppm of divalent cation.

5. The process of claim 1 wherein the preslug contains about 100 to about 1,500 ppm of the biopolymer.

6. The process of claim 1 wherein about 2 to about 25 percent formation pore volume of the preslug is injected into the reservoir.

7. The process of claim 1 wherein the biopolymer is a polysaccharide.

8. In a process of recovering hydrocarbon from a subterranean reservoir containing connate water having at least 1,000 ppm of divalent cation and having an injection means in fluid communication with a production means and wherein a micellar dispersion is injected into the reservoir and displaced toward the production means to recover hydrocarbon therethrough, the steps comprising injecting previously to the micellar dispersion about 1 to about 50 percent formation pore volume of an aqueous slug containing a biopolymer, the effect of the aqueous biopolymer being to inhibit the tendency of the divalent cations to adversely influence hydrocarbon recovery with the micellar dispersion.

9. The process of claim 8 wherein the concentration of the biopolymer within the aqueous slug is about 100 to about 1,500 ppm.

* * * * *